(12) United States Patent
Moh et al.

(10) Patent No.: US 6,415,361 B1
(45) Date of Patent: Jul. 2, 2002

(54) APPARATUS FOR CONTROLLING CACHE BY USING DUAL-PORT TRANSACTION BUFFERS

(75) Inventors: Sang Man Moh; Jong Seok Han; An Do Ki; Woo Jong Hahn; Suk Han Yoon, all of Taejon; Gil Rok Oh, Seoul, all of (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/487,348

(22) Filed: Jan. 19, 2000

(30) Foreign Application Priority Data

Dec. 15, 1999 (KR) .............................. 99-58025

(51) Int. Cl.⁷ .............................................. G06F 12/00
(52) U.S. Cl. ...................... 711/141; 711/130; 711/131
(58) Field of Search ................. 711/130, 131, 711/141, 147, 148, 149

(56) References Cited

U.S. PATENT DOCUMENTS

| | | | |
|---|---|---|---|
| 5,465,344 A | 11/1995 | Hirai et al. .............. | 3295/458 |
| 5,636,358 A | 6/1997 | Brant et al. .............. | 395/444 |
| 5,682,498 A | 10/1997 | Harness .................... | 395/433 |
| 5,721,839 A | 2/1998 | Callison et al. ......... | 395/308 |
| 5,860,120 A | 1/1999 | Young et al. ............. | 711/156 |

Primary Examiner—Kevin Verbrugge
(74) Attorney, Agent, or Firm—Jacobson Holman, PLLC (57) ABSTRACT

An apparatus for controlling a cache in a computing node, which is located between a node bus and an interconnection network to perform a cache coherence protocol, includes: a node bus interface for interfacing with the node bus; an interconnection network interface for interfacing with the interconnection network; a cache control logic means for controlling the cache to perform the cache coherence protocol; bus-side dual-port transaction buffers coupled between said node bus interface and said cache control logic means for buffering transaction requested and replied from or to local processors contained in the computing node; and network-side dual-port transaction buffers coupled between said interconnection network interface and said cache control logic for buffering transaction requested and replied from or to remote processors contained in another computing node coupled to the interconnection network.

15 Claims, 6 Drawing Sheets

APPARATUS FOR CONTROLLING CACHE BY USING DUAL-PORT TRANSACTION BUFFERS

FIELD OF THE INVENTION

The present invention relates to a cache-coherent non-uniform memory access (CC-NUMA) parallel computer system including a plurality of computing nodes coupled to an interconnection network; and, more particularly, to an apparatus for controlling a cache by using dual-port transaction buffers in the CC-NUMA parallel computer system.

DESCRIPTION OF THE PRIOR ART

Generally, a cache-coherent non-uniform memory access (CC-NUMA) parallel computer system conforms to a known cache coherence protocol. The CC-NUMA parallel computer system includes a plurality of computing nodes. In the CC-NUMA parallel computer system called a distributed shared memory system, the plurality of computing nodes include physically distributed memory modules corresponding to a logically shared memory, wherein each computing node is a symmetric multiprocessor having at most four processors, a memory and an input/output device.

In the publication of U.S. Pat. No. 5,721,839 entitled "Apparatus and Method for Synchronously Providing a Fullness Indication of a Dual Ported Buffer Situated between Two Asynchronous Buses" issued on Feb. 24, 1998 to Callison et al., a computer system includes a bridge between a peripheral component interconnect (PCI) bus and an extended industry standard architecture (EISA) bus; and a bridge between the PCI bus and another PCI bus, which have a data buffer to store write and read data. The data buffer is a dual-port buffer consisting of a first-in-first-out (FIFO) memory. The computer system allows two busses coupled to the bridge to independently operate with different clocks.

Further, in the publication of U.S. Pat. No. 5,636,358 entitled "Apparatus and Method for Transferring Data in a Storage Device Including a Dual-Port Buffer" issued on Jun. 3, 1997 to Brant et al., a computer storage subsystem includes a dual-port buffer memory. The dual-port buffer memory provides two internal data busses: one bus for transferring data between the dual-port buffer memory and the storage units, and the other bus for transferring data between the dual-port buffer memory and a CPU. The throughput of the storage subsystem is roughly equivalent to the bandwidth of the slower of the two busses. The storage subsystem employs a plurality of dual-port buffer memories in parallel to increase the throughput of the storage subsystem and match the bandwidth of the two busses.

Furthermore, in the publication of U.S. Pat. No. 5,860,120 entitled "Directory-Based Coherency System Using Two Bits to Maintain Coherence on a Dual Ported Memory System" issued on Jan. 12, 1999 to Young et al., a directory-based cache coherence memory system includes a dual ported system memory shared by multiple processors within the computer system; a plurality of data cache memories, at least one data cache associated with each processor; and first and second memory busses, the first memory bus connecting a first subset of processors and associated data cache memories to a first port of the system memory, and the second memory bus connecting a second subset of processors and associated data cache memories to a second port of the system memory.

There is a problem that a system and apparatus disclosed in the prior art U.S. patents can not effectively perform the cache coherence protocol. Accordingly, it is strongly needed that an apparatus for controlling a cache by using dual-port transaction buffers to effectively perform the cache coherence protocol.

SUMMARY OF THE INVENTION

It is, therefore, an object of the present invention to provide an apparatus for controlling a cache by using dual-port transaction buffers that is capable of effectively performing a cache coherence protocol.

In accordance with an aspect of the present invention, there is provided an apparatus for controlling a cache in a computing node, which is located between a node bus and an interconnection network to perform a cache coherence protocol, comprising: a node bus interface means for interfacing with the node bus; an interconnection network interface means for interfacing with the interconnection network; a cache control logic means for controlling the cache to perform the cache coherence protocol; a plurality of first dual-port transaction buffering means coupled between said node bus interface means and said cache control logic means for buffering transaction requested and replied from or to local processors contained in the computing node; and a plurality of second dual-port transaction buffering means coupled between said interconnection network interface means and said cache control logic means for buffering transaction requested and replied from or to remote processors contained in another computing node coupled to the interconnection network.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Figure 1:
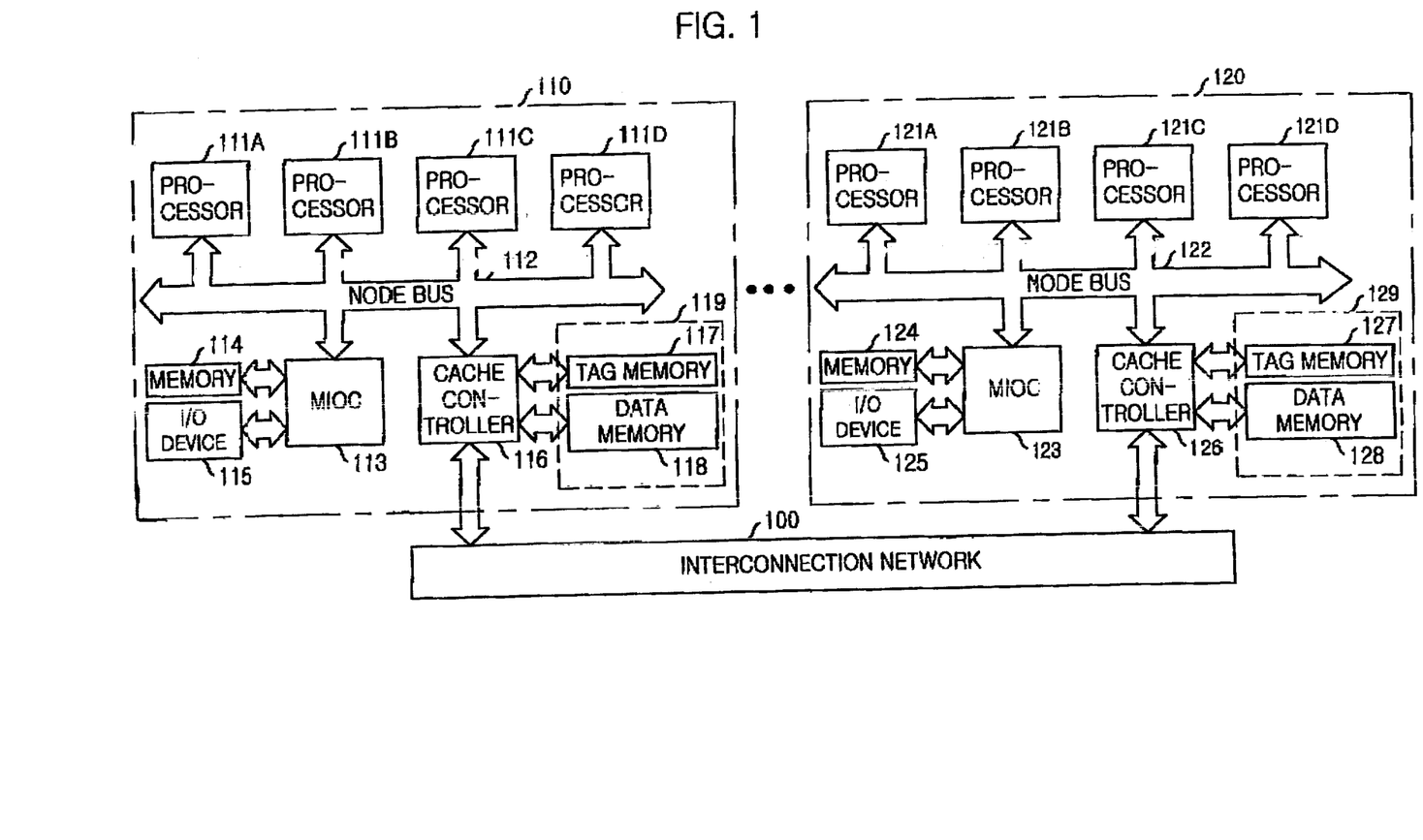
FIG. 1 is a block diagram illustrating a CC-NUMA parallel computer system.

Referring to FIG. 1, there is a block diagram illustrating a CC-NUMA computer system. As shown, each of computing nodes 110 and 120 is a symmetric multiprocessor including one processor at the minimum or four processors at the maximum.

The computing node 110 includes processors 111A, 111B, 111C and 111D coupled to a node bus 112. Similarly, the computing node 120 includes processors 121A, 121B, 121C and 121D coupled to a node bus 122.

The node bus 112 is coupled to a memory and input/output (I/O) controller (MIOC) 113, which is accessible to a memory 114 and an I/O device 115. Similarly, the node bus 122 is coupled to a MIOC 123, which can access a memory 124 and an I/O device 125.

Further, the node bus 112 is coupled to a cache controller 116. The cache controller 116 connects the computingnode 110 to an interconnection network 100. The cache controller 116 between the node bus 112 and the interconnection network 100 controls a cache 119, which includes a tag memory 117 and a data memory 118, to perform a cache coherence protocol. Similarly the node bus 122 is coupled to a cache controller 126. The cache controller 126 connects the computing node 120 to the interconnection network 100. The cache controller 126 between the node bus 122 and the interconnection network 100 controls a cache 129, which includes a tag memory 127 and a data memory 128, to perform the cache coherence protocol.

Figure 2:
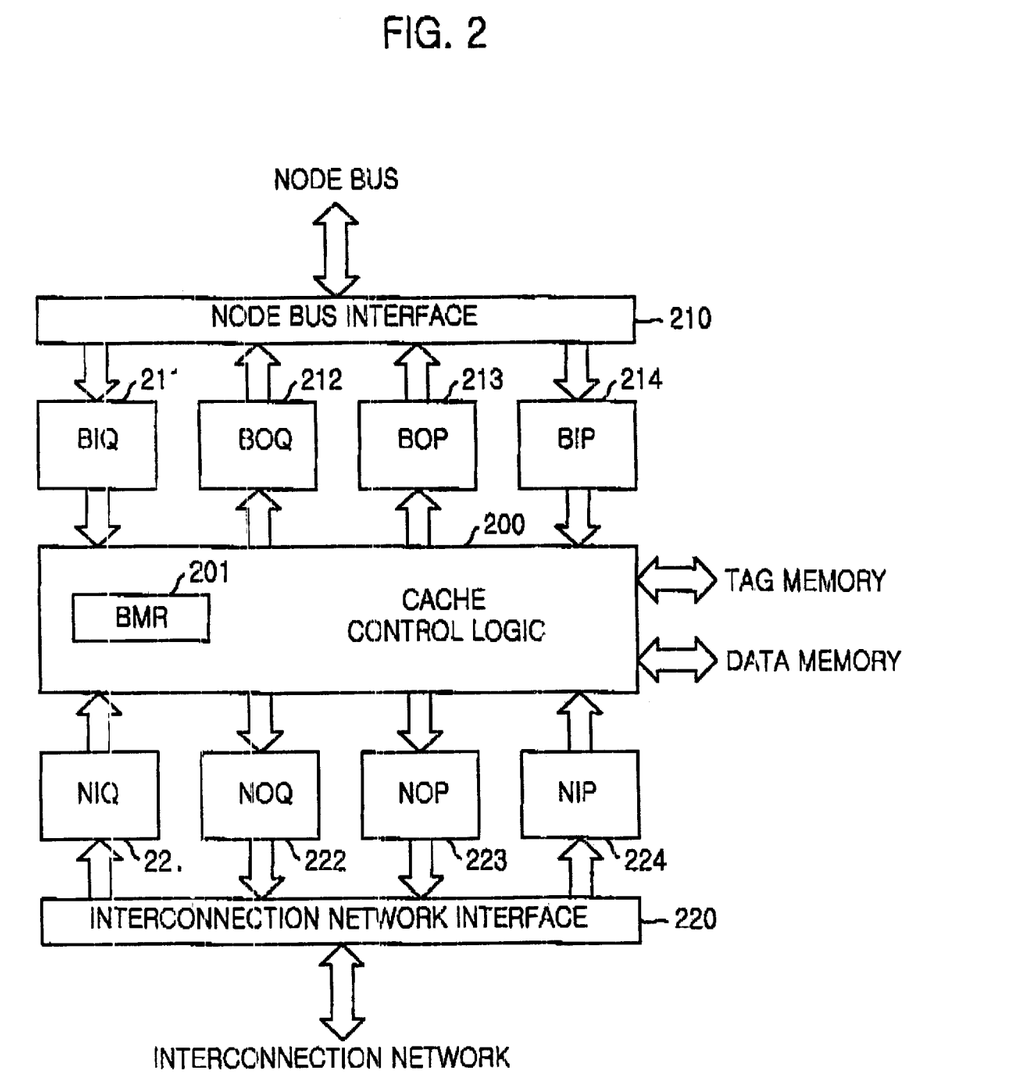
FIG. 2 is a block diagram showing a cache controller having a plurality of dual-port transaction buffers in accordance with the present invention.

Referring to FIG. 2, there is shown a block diagram depicting a cache controller having a plurality of dual-port transaction buffers in accordance with the present invention. As shown, the cache controllers 116 and 126 shown in FIG. 1 include a cache control logic 200, a node bus interface 210 and an interconnection network interface 220. Since the operation of the computing node 110 is the same as that of the computing node 120, the following description is restricted to the computing node 110.

The cache controller 116 includes a bus-side incoming request buffer (BIQ) 211, a bus-side outgoing request buffer (BOQ) 212, a bus-side outgoing reply buffer (BOP) 213 and a bus-side incoming reply buffer (BIP) 214 as dual-port transaction buffers located at a bus side. The BIQ 211 buffers transaction requested from a local processor 111A, 111B, 111C or 111D to the cache controller 116. The BOP 213 buffers the transaction replied from the cache controller 116 to the local processor 111A, 111B, 111C or 111D. The BOQ 212 buffers transaction requested from the cache controller 116 to the local processor 111A, 111B, 111C or 111D or a local MIOC 113. The BIP 214 buffers the transaction replied from the local processor 111A, 111B, 111C or 111D or the local MIOC 113 to the cache controller 116.

Further, the cache controller 116 includes a network-side incoming request buffer (NIQ) 221, a network-side outgoing request buffer (NOQ) 222, a network-side outgoing reply buffer (NOP) 223 and a network-side incoming reply buffer (NIP) 224 as dual-port transaction buffers located at a network side. The NIQ 221 buffers transaction requested from a remote processor 121A, 121B, 121C or 121D shown in FIG. 1 to the cache controller 116. The NOP 223 buffers the transaction replied from the cache controller 116 to the remote processor 121A, 121B, 121C or 121D. The NOQ 222 buffers transaction requested from the cache controller 116 to the remote processor 121A, 121B, 121C or 121D or a remote MIOC 123 shown in FIG. 1. The NIP 224 buffers the transaction replied from the remote processor 121A, 121B, 121C or 121D or the remote MIOC 123 to the cache controller 116.

Figure 3:
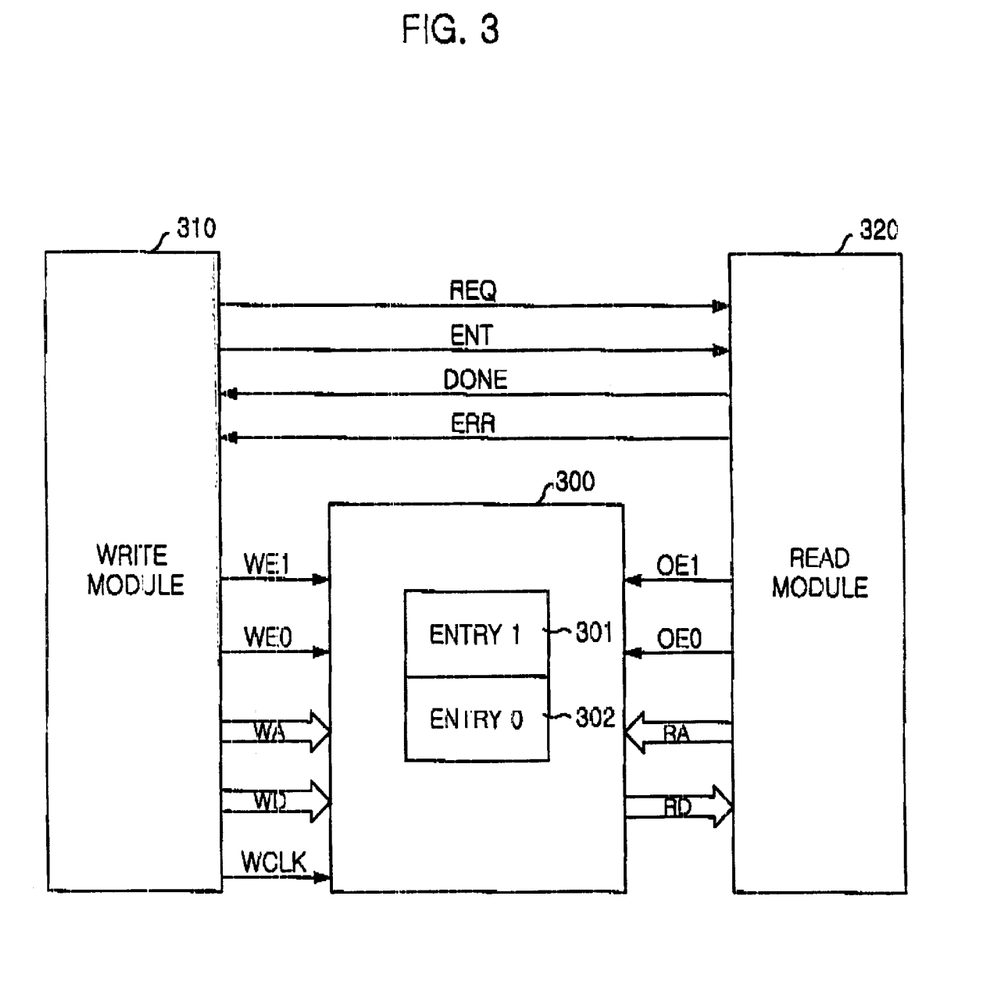
FIG. 3 is a block diagram describing the relationship between write and read modules and a dual-port transaction buffer shown in FIG. 2.

Referring to FIG. 3, there is shown a block diagram describing the relationship between write and read modules and a dual-port transaction buffer shown in FIG. 2. As shown, the dual-port transaction buffer 300 includes entries 301 and coupled to a write module 310 via a write port (not shown) and coupled to a read module 320 via a read port (not shown). The write module 310 and the read module 320 may be varied by the dual-port transaction buffers provided with the cache controller. That is, when the node bus interface 210 owns the write module 310 coupled to the BIQ 211 and the BIP 214, the cache control logic 200 owns the read module 320. On the other hand, when the cache control logic 200 owns the write module 310 coupled to the BOQ 212 and the BOP 213, the node bus interface 210 owns the read module 320. Further, when the interconnection network interface 220 owns the write module 310 coupled to the NIQ 221 and the NIP 224, the cache control logic 200 owns the read module 320. On the other hand, when the cache control logic 200 owns the write module 310 coupled to the NOQ 222 and the NOP 223, the interconnection network interface 220 owns the read module 320.

The write module 310 transmits write enable signals WE1 and WE0, a write address signal WA, a write data signal WD and a clock signal WCLK to the dual-port transaction buffer 300 via the write port. The write enable signal WE1 enables a write operation to an entry 301 contained in the dual-port transaction buffer 300. The write enable signal WE0 enables a write operation to an entry 302 contained in the dual-port transaction buffer 300. The write address signal WA designates an address of the entry 301 or 302. The write data signal WD contains data to be written to the entry 301 or 302. The clock signal WCLK is a square-wave used in a synchronous operation of the write port.

The read module 320 transmits read enable signals OE1 and OE0 and a read address signal RA to the dual-port transaction buffer 300 via the read port. The read enable signal OE1 enables a read operation to the entry 301 contained in the dual-port transaction buffer 300. The read enable signal OE0 enables a read operation to an entry 302 contained in the dual-port transaction buffer 300. The read address signal RA designates an address of the entry 301 or 302. The read data signal RD contains data to be read from the entry 301 or 302. The read port asynchronously reads data stored in the dual-port transaction buffer 300 without a clock signal.

Asynchronous interface signals REQ, ENT, DONE and ERR are used between the write module 310 and the read module 320 so that the write and read operation can be high-speedily performed without the conflict between the write module 310 and the read module 320.

The write module 310 transmits the asynchronous interface signal REQ to the read module 320 so that the read module 320 reads data written to the dual-port transaction buffer 300.

The write module 310 transmits the asynchronous interface signal ENT to the read module 320 so that the read module 320 identifies the entry 301 or 302 containing the data written to the dual-port transaction buffer 300.

The read module 320 transmits the asynchronous interface signal DONE to the write module 310 to inform the write module 310 that the read module 320 has read the data written to the dual-port transaction buffer 300.

The read module 320 transmits the asynchronous interface signal ERR to the write module 310 to inform the write module 310 if error has occurred at the read operation or not.

Figure 4:
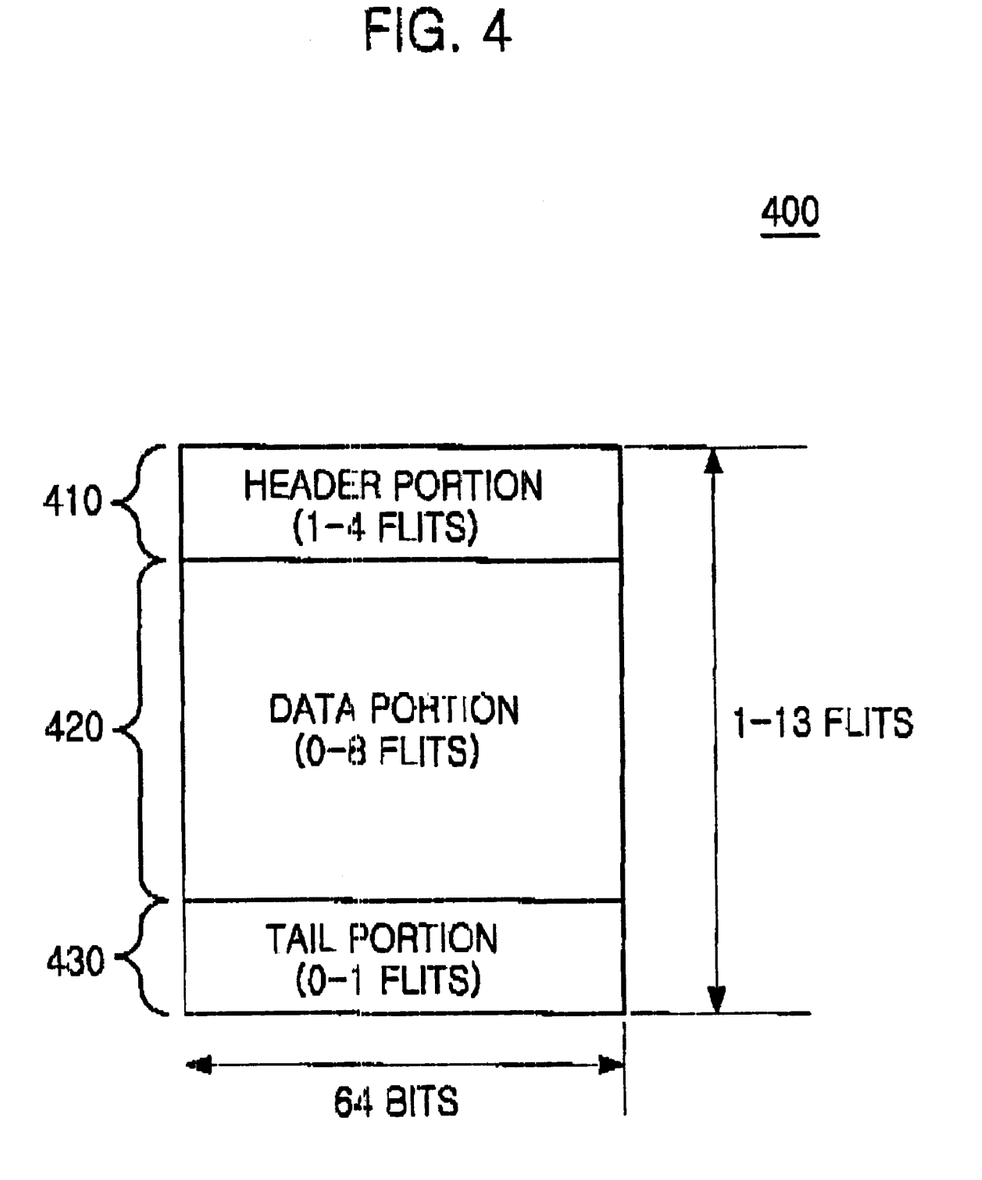
FIG. 4 is a block diagram illustrating the configuration of an entry contained in the dual-port transaction buffer shown in FIG. 3.

Referring to FIG. 4, there is shown a block diagram illustrating the configuration of an entry contained in the dual-port transaction buffer shown in FIG. 3.

As shown, the entry includes a header portion 410, a data portion 420 and a tail portion 430. The header portion 410 contains basic information associated with transaction, wherein the basic information includes a type of the transaction, an address, the length of the transaction and the length of memory data. The header portion 410 consists of one flit to four flits, wherein one flit consists of 64 bits. The data portion 420 stores the memory data, which is temporarily stored in a data memory 118 or 128 shown in FIG. 1. The data portion 420 consists of one flit to eight flits. The tail portion 430 stores error information associated with the transaction. The tail portion 420 consists of zero to one flit.

The length of transaction written to the entry is variable. For example, the length of the transaction is one flit at the minimum and thirteen flits at the maximum. The reason why the length of the transaction is variable is because the header, data and tail portions 410, 420 and 430 have different length from each other depending upon the type of the transaction.

Figure 5:
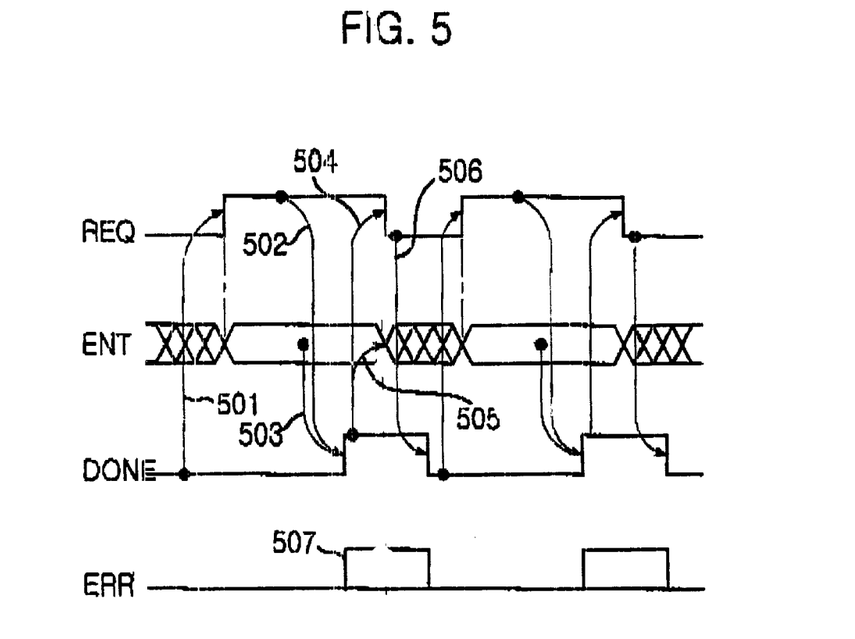
FIG. 5 is a timing diagram illustrating asynchronous interface signals between a write module and a read module shown in FIG. 3.

Referring to FIG. 5, there is shown a timing diagram illustrating asynchronous interface signals between a write module and a read module shown in FIG. 3.

Referring to a reference numeral 501, after a write module 310 shown in FIG. 3 writes data to an entry, an asynchronous interface signal REQ is activated from a low level signal to a high level signal while an asynchronous interface signal DONE is inactivated.

While the asynchronous interface signal REQ is activated, the asynchronous interface signal ENT is also asserted, wherein the asynchronous interface signal ENT has identification information associated with an entry containing the transaction data.

Referring to reference numerals 502 and 503, after a read module 320 shown in FIG. 3 reads the data written to the entry in response to the asynchronous interface signal ENT, the asynchronous interface signal DONE is activated from the low level signal to the high level signal.

Referring to a reference numeral 507, when the read operation of the read module 320 is normally performed, an asynchronous interface signal ERR becomes inactivated. On the other hand, when the read operation of the read module 320 is erroneous, the asynchronous interface signal ERR becomes activated.

Referring to a reference numeral 504, a predetermined time after the asynchronous interface signal DONE has been activated from the low level signal to the high level signal, the asynchronous interface signal REQ becomes inactivated.

Referring to a reference numeral 505, the asynchronous interface signal ENT is no more validate.

Referring to a reference numeral 506, when the asynchronous interface signal REQ is inactivated from the high level signal to the low level signal, the asynchronous interface signal DONE becomes inactivated and the read operation of the read module may be complete.

Figure 6:
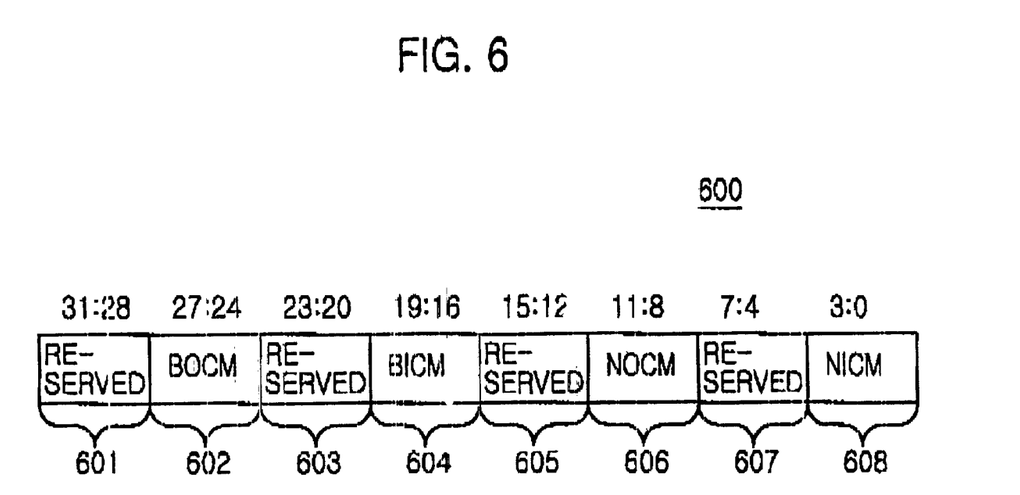
FIG. 6 is an exemplary diagram depicting a configuration of a buffering mode register (BMR) shown in FIG. 2.

Referring to FIG. 6, there is shown an exemplary diagram depicting a configuration of a buffering mode register (BMR) 201 shown in FIG. 2.

As shown, the BMR 201 includes a bus-side outgoing cut-through mode (BOCM) field 602, a bus-side incoming cut-through mode (BICM) field 604, a network-side outgoing cut-through mode (NOCM) field 606, a network-side incoming cut-through mode (NICM) field 608 and reserved fields 601, 603, 605 and 607. A value of zero to fifteen can be written to the BOCM, BICM, NOCM and NICM fields 602, 604, 606 and 608.

The BOCM field 602 represents a cut-through mode of the BOQ 212 and the BOP 213 as the dual-port transaction buffers shown in FIG. 2. The BICM field 604 represents a cut-through mode of the BIQ 211 and the BIP 214 shown in FIG. 2. The NOCM field 606 represents a cut-through mode of the NOQ 222 and the NOP 223 shown in FIG. 2. The NICM field 608 represents a cut-through mode of the NIQ 222 and the NIP 223 shown in FIG. 2.

When the value written to the BOCM, BICM, NOCM and NICM fields 602, 604, 606 and 608 is zero, a corresponding dual-port transaction buffer is controlled by a virtual cut-through mode. Further, when the value written to the BOCM, BICM, NOCM and NICM fields 602, 604, 606 and 608 is fifteen, the corresponding dual-port transaction buffer is controlled by a store-and-forward mode. Furthermore, when the value written to the BOCM, BICM, NOCM and NICM fields 602, 604, 606 and 608 is one to fourteen, the corresponding buffer is controlled by a delayed virtual cut-through mode. That is, when the value written to the BOCM, BICM, NOCM and NICM fields 602, 604, 606 and 608 is one, the corresponding dual-port transaction buffer is controlled by a one-clock delayed virtual cut-through mode. Further, when the value written to the BOCM, BICM, NOCM and NICM fields 602, 604, 606 and 608 is fourteen, the corresponding dual-port transaction buffer is controlled by a fourteen-clock delayed virtual cut-through mode.

Figure 7:
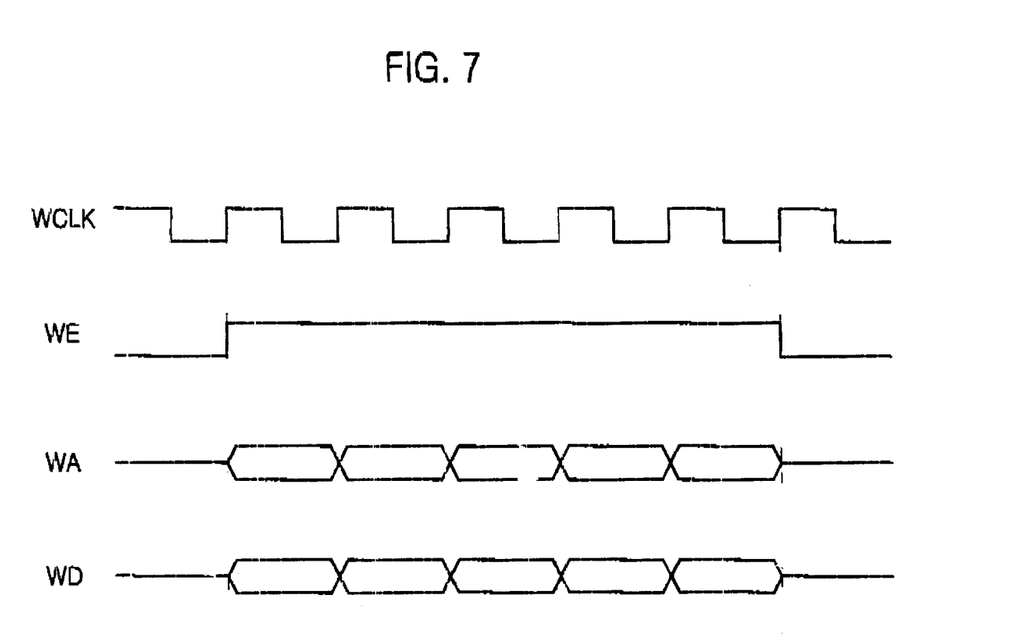
FIG. 7 is a timing diagram describing the operation of writing data to the dual-port transaction buffer shown in FIG. 3.

Referring to FIG. 7, there is shown a timing diagram illustrating the operation of writing data to the dual-port transaction buffer shown in FIG. 3.

As shown, the write operation is performed in synchronization with a rising edge of a clock signal WCLK. Also, a write enable signal WE, a write address signal WA and a write data signal WD are in synchronization with the clock signal WCLK corresponding to the number of flits of the data written to the dual-port transaction buffer. When the write operation is performed, the write enable signal WE is activated.

Figure 8:
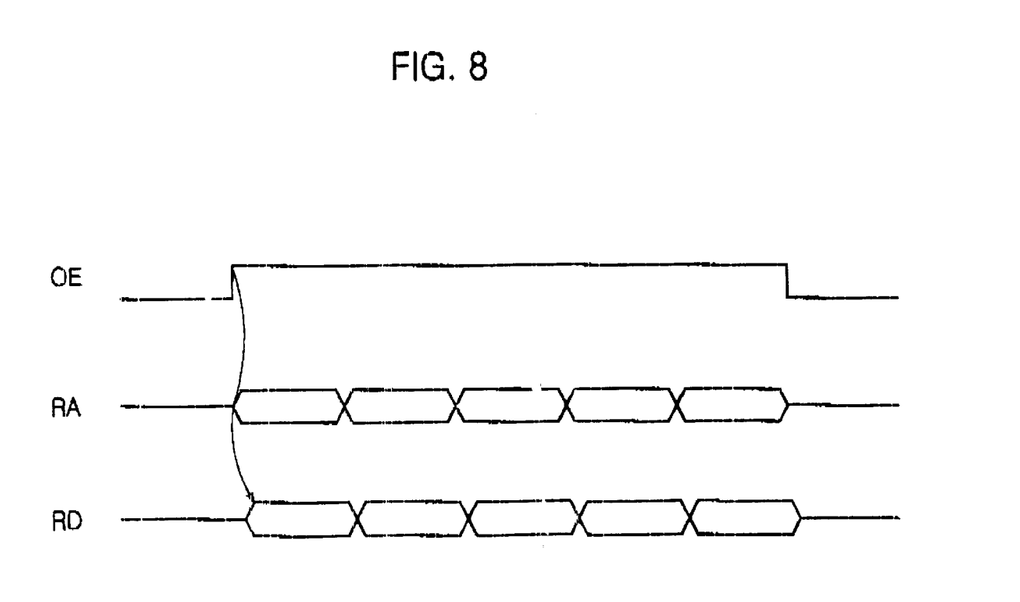
FIG. 8 is a timing diagram describing the operation of reading data from the dual-port transaction buffer shown in FIG. 3.

Referring to FIG. 8, there is shown a timing diagram illustrating the operation of reading data from the dual-port transaction buffer shown in FIG. 3.

As shown, the read operation is asynchronously performed without the clock signal WCLK in connection with FIG. 7. When the read operation is performed, the read enable signal OE is activated. When the read enable signal OE is activated, a read address signal RA and a read data signal RD are generated.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling a cache in a computing node, which is located between a node bus and an interconnection network to perform a cache coherence protocol, comprising:

a node bus interface means for interfacing with the node bus;

an interconnection network interface means for interfacing with the interconnection network;

a cache control logic means for controlling the cache to perform the cache coherence protocol;

a plurality of first dual-port transaction buffering means coupled between said node bus interface means and said cache control logic means for buffering transactions requested and replied from or to local processors contained in the computing node; and a plurality of second dual-port transaction buffering means coupled between said interconnection network interface means and said cache control logic means for buffering transactions requested and replied from or to remote processors contained in another computing node coupled to the interconnection network.

2. The apparatus as recited in claim 1, wherein said cache control logic means further includes:

a buffering mode register for controlling a buffering mode of said first and second dual-port transaction buffering means, wherein said buffering mode register includes a bus-side outgoing cut-through mode field, a bus-side incoming cut-through mode field, a network-side outgoing cut-through mode field, a network-side incoming cut-through mode field and reserved fields.

3. The apparatus as recited in claim 1, wherein said plurality of first dual-port transaction buffering means includes:

a first incoming request buffer for buffering transactions requested from a local processor to said cache control logic means;

a first outgoing reply buffer for buffering the transactions replied from said cache control logic means to the local processor;

a first outgoing request buffer for buffering transactions requested from said cache control logic means to the local processor; and a first incoming reply buffer for buffering transactions replied from the local processor to said cache control logic means.

4. The apparatus as recited in claim 1, wherein said plurality of second dual-port transaction buffering means includes:

a second incoming request buffer for buffering transactions requested from a remote processor to said cache control logic means;

a second outgoing reply buffer for buffering the transactions replied from said cache control logic means to the remote processor;

a second outgoing request buffer for buffering transactions requested from said cache control logic means to the remote processor; and a second incoming reply buffer for buffering the transactions replied from the remote processor to said cache control logic means.

5. The apparatus as recited in claim 1, wherein each of said first and second dual-port transaction buffering means includes:

a plurality of entries having the same configuration as each other.

6. The apparatus as recited in claim 5, wherein each of said entries includes:

a header portion containing a type of the transaction, an address, the length of the transaction and the length of memory data;

a data portion containing the memory data; and a tail portion containing error information associated with the transaction.

7. The apparatus as recited in claim 1, wherein said node bus interface means includes:

a write module for transmitting a write enable signal enabling a write operation to an entry, a write address signal designating an address of the entry and a write data signal containing data to be written to the entry in synchronization with a clock signal; and a read module for transmitting a read enable signal enabling a read operation to the entry and a read address signal designating an address of the entry and reading the data from the entry corresponding to the designated address.

8. The apparatus as recited in claim 1, wherein said cache control logic means includes:

a write module for transmitting a write enable signal enabling a write operation to an entry, a write address signal designating an address of the entry and a write data signal containing data to be written to the entry in synchronization with a clock signal; and a read module for transmitting a read enable signal enabling a read operation to the entry and a read address signal designating an address of the entry and reading the data from the entry corresponding to the designated address.

9. The apparatus as recited in claim 7, wherein said write module transmits a first asynchronous interface signal to said read module so that said read module reads data written to the entry and a second asynchronous interface signal to said read module so that said read module identifies the entry.

10. The apparatus as recited in claim 7, said read module transmits a first asynchronous interface signal to said write module to inform said write module that said read module has read the data written to the entry and a second asynchronous interface signal to said write module to inform said write module that error has occurred at a read operation.

11. The apparatus as recited in claim 8, wherein said write module transmits a first asynchronous interface signal to said read module so that said read module reads data written to the entry and a second asynchronous interface signal to said read module so that said read module identifies the entry.

12. The apparatus as recited in claim 8, said read module transmits a first asynchronous interface signal to said write module to inform said write module that said read module has read the data written to the entry and a second asynchronous interface signal to said write module to inform said write module that error has occurred at a read operation.

13. The apparatus as recited in claim 1, wherein said interconnection network interface means includes:

a write module for transmitting a write enable signal enabling a write operation to an entry, a write address signal designating an address of the entry and a write data signal containing data to be written to the entry in synchronization with a clock signal; and a read module for transmitting a read enable signal enabling a read operation to the entry and a read address signal designating an address of the entry and reading the data from the entry corresponding to the designated address.

14. The apparatus as recited in claim 13, wherein said write module transmits a first asynchronous interface signal to said read module so that said read module reads data written to the entry and a second asynchronous interface signal to said read module so that said read module identifies the entry.

15. The apparatus as recited in claim 13, said read module transmits a first asynchronous interface signal to said write module to inform said write module that said read module has read the data written to the entry and a second asynchronous interface signal to said write module to inform said write module that error has occurred at a read operation.

* * * * *